United States Patent Office 3,494,909
Patented Feb. 10, 1970

3,494,909
POLYMERIZATION OF VINYL CHLORIDE WITH CATALYST COMPOSITION OF NICKEL PEROXIDE AND AN ALKYL METAL OR ZIEGLER-NATTA CATALYST
Kunio Nakagawa, Hyogo Prefecture, and Tadashi Nakata, Osaka Prefecture, Japan, assignors to Shionogi & Co., Ltd., Osaka Prefecture, Japan
No Drawing. Filed Mar. 25, 1966, Ser. No. 537,320
Claims priority, application Japan, Apr. 1, 1965, 40/19,358
Int. Cl. C08f 1/56, 1/60
U.S. Cl. 260—92.8                6 Claims

ABSTRACT OF THE DISCLOSURE

The process for preparing polyvinyl chloride which comprises polymerizing vinylchloride at a temperature of from −80° C. to 100° C. in an inert atmosphere in the presence of a catalyst composition, consisting essentially of nickel peroxide and a lower alkyl metal component such as triethyl aluminum or of a catalyst composition consisting essentially of nickel peroxide and a Ziegler-Natta catalyst.

---

The present invention relates to a polymerization process. More particularly, it relates to a process for preparing polyvinyl chloride by polymerization of vinyl chloride in the presence of a catalyst composition consisting essentially of nickel peroxide and an alkyl metal or of nickel peroxide and a Ziegler-Natta catalyst.

Hitherto, there has been known that nickel peroxide itself can initiate the polymerization of vinyl chloride to polyvinyl chloride but in a low and unsatisfactory rate of polymerization, especially at a low temperature. There has also been known that an alkyl metal itself has no activity for the initiation of polymerization of vinyl chloride and, therefore, can not be used as a catalyst in the production of polyvinyl chloride. There has further been known that a Ziegler-Natta catalyst itself can induce the polymerization of vinyl chloride but only with simultaneous dehydrochlorination and, therefore, does not afford polyvinyl chloride as the product.

It has now been discovered that the use of a catalyst composition consisting essentially of nickel peroxide and an alkyl metal can initiate the polymerization of vinyl chloride to polyvinyl chloride with a high rate of polymerization even at a low temperature. It has also been discovered that the use of a catalyst composition consisting essentially of nickel peroxide and a Ziegler-Natta catalyst can induce the polymerization of vinyl chloride to polyvinyl chloride in a high rate of polymerization without by-production of dehydrochlorinated polymers. The present invention is based on these discoveries.

A basic object of the present invention is to embody a process for preparing polyvinyl chloride. Another object of this invention is to embody a process for polymerizing vinyl chloride to polyvinyl chloride with a high rate of polymerization. Another object of the invention is to embody a catalyst composition which can induce the polymerization of vinyl chloride to polyvinyl chloride with a high rate of polymerization. A further object of the invention is to embody a catalyst composition which can induce the polymerization of vinyl chloride to polyvinyl chloride with a high rate of polymerization even at a low temperature. These and other objects will be apparent to those conversant with the art to which the present invention pertains from the subsequent description.

According to the present invention, the polymerization of vinyl chloride to polyvinyl chloride is accomplished in the presence of a catalyst composition consisting essentially of nickel peroxide and an alkyl metal or of nickel peroxide and a Ziegler-Natta catalyst.

The nickel peroxide employed as a component in the catalyst composition of the present invention is a black fine powder containing firmly bonded water and capable of liberating iodine from potassium iodide solution. Although the exact chemical structure has not yet been confirmed, the results of analysis make it possible to give a molecular formula corresponding to $Ni_4O_6H_{11}$. The nickel peroxide contains about $0.3 \times 10^{-2}$ to about $0.4 \times 10^{-2}$ gram atom of active oxygen per gram (determined by the iodine method). The catalytic activity is reduced gradually during storage and rapidly on heating. It should be noted that the active nickel peroxide herein described is an amorphous and non-stoichiometric compound, whereas nickel sesquioxide $(Ni_2O_3)$ (usually called "nickel peroxide" on market) is crystalline and inactive. Thus, the use of freshly prepared nickel peroxide is essential. The preparation of the active nickel peroxide may be effected by a conventional procedure, e.g. treatment of a nickel salt (e.g. nickel sulfate, nickel nitrate) with a strong oxidizing agent such as an alkali metal hypohalite (e.g. sodium hypochlorite, potassium hypochlorite, sodium hypobromite) or an alkali metal persulfate (e.g. sodium persulfate, potassium persulfate) in an aqueous alkaline meduim, followed by collecting and drying the precipitate.

As the alkyl metal, there is preferably used the one represented by the formula: $RnM$ wherein R is a lower alkyl group (e.g. methyl, ethyl, n-propyl, isopropyl, n-butyl, isobutyl, t-butyl), M is a metal of Groups II to IV in the Periodic Table (e.g. magnesium, zinc, cadmium, boron, aluminum, lead) and $n$ is an integer corresponding to the valence of the metal represented by M. Specific examples of the alkyl metal are diethylmagnesium, diethylzinc, dipropylzinc, diethylcadmium, trimethylboron, triethylboron, tri-n-propylboron, tri-n-butylboron, triethylaluminum, triisopropylaluminum, tetraethyllead, etc.

As the Ziegler-Natta catalyst, there is preferably used the one comprising as a component an alkyl metal represented by the formula: $RnM$ wherein R, M and $n$ have each the same significance as designated above. More preferably, there is used the one consisting essentially of an alkyl metal represented by the formula: $RnM$ wherein R, M and $n$ have each the same significance as designated above and a transition metal halide represented by the formula: $M'Xm$ wherein M' is a transition metal (e.g. titanium, vanadium, molybdenum, tungsten), X is a halogen atom (e.g. chlorine, bromine, iodine, fluorine) and $m$ is an integer corresponding the valence of the transition metal represented by M'. Specific examples of the transition metal halide are titanium trichloride, titanium tetrachloride, vanadium trichloride, vanadium tetrachloride, molybdenum trichloride, tungsten trichloride, etc.

A suitable ratio of the active oxygen content (the unit being represented by O*g-atom) in the nickel peroxide and the mole number of the alkyl metal is about 1:1–15:1. The ratio outside this range may result in depression of the rate of polymerization.

A favorable ratio of the active oxygen content in the nickel peroxide and the mole number of the Ziegler-Natta catalyst varies with the composition of the Ziegler-Natta catalyst and may be decided on each case. For instance, when the Ziegler-Natta catalyst consists of 2 molar amount of triethylaluminum and 1 molar amount of titanium tetrachloride, the ratio of the active oxygen content in the nickel peroxide, the mole number of triethylaluminum and of titanium tetrachloride is preferred to be about 35:2:1. The ratio outside this range may reduce the rate of polymerization or induce dehydrohalogenation.

In the preparation of the catalyst composition of this invention, each component may be admixed as such or in combination with a solid carrier, or in solvent solution. Suitable solvents include benzene, toluene, xylene, n-hexane, n-heptane and the like.

The polymerization is effecected by contacting vinyl chloride with the above described catalyst composition. The temperature employed will depend upon the exact catalyst composition utilized. Temperatures generally range from about −80° C. to about 100° C. When the catalyst composition is the one consisting essentially of nickel peroxide and the alkyl metal, the rate of polymerization is scarcely influenced by variation of the temperature and a high conversion can be seen sometimes at a lower temperature (e.g. −78° C.) rather than at a higher temperature (e.g. 40° C.). Thus, the catalyst composition consisting essentially of nickel peroxide and the alkyl metal can be effectively used for the production of polyvinyl chloride even at an extremely low temperature. When the catalyst composition is the one consisting essentially of nickel peroxide and the Ziegler-Natta catalyst, the rate of polymerization is more or less affected by variation of the temperature and a high conversion may be generally obtained at a relatively high temperature (e.g. 60° C.).

The process is conducted in an inert atmosphere. This is preferably accomplished by first sweeping out the reaction zone with an inert gas. Suitable inert materials include nitrogen, argon, and the like. The process should also be conducted under substantially anhydrous conditions. This is accomplished by using anhydrous reactants and dry reaction vessels and maintaining customary precautions during the reaction to keep water out of the reaction vessel.

The most convenient operating pressure is that which is created by the system and will vary depending upon the specific nature of the solvent and the respective amounts of the solvent and vinyl chloride. For convenience, such pressures are termed "autogenic" pressure. If desired, higher or lower pressures may be employed.

At the completion of the reaction, the reaction mixture is treated with a proton donor to deactivate the catalyst composition. This includes material having active hydrogen such as water, mineral or organic acids, mercaptans, alcohols and the like. For dissolving the nickel peroxide in the catalyst composition, there may be used a mineral acid such as hydrochloric acid, sulfuric acid or nitric acid.

The polyvinyl chloride prepared by the process of the present invention is characterized in possessing a high stereoregularity and an excellent crystallinity. It is also characterized in having a high syndiotacticity. Thus, it is useful as the starting material in the production of plastics provided with thermostability and light stability.

Practical embodiments of the present invention are shown in the following examples. In these examples, the regularity of the product is represented by the infrared absorbance ratio of $D_{638}/D_{690}$ and $D_{613}/D_{690}$. $D_{638}$, $D_{613}$ and $D_{690}$ are the absorbances of the bands appeared at 638, 613 and 690 cm.$^{-1}$ in the infrared spectrum, which are attributed respectively to the crystalline syndiotactic unit, the amorphous syndiotactic unit and the isotactic unit in the polymer chain. Further, the degree of polymerization for the soluble fraction of the product in nitrobenzene is calculated by the equation as follows:

$$\bar{P} = 500 \times \text{antilog} \frac{[\eta]}{0.168} - 1$$

wherein $[\eta]$ is in the intrinsic viscosity determined by viscosity measurement of the nitrobenzene solution of the product at 30° C.

EXAMPLE 1

Five millilitres of vinyl chloride are introduced by distillation into an evacuated reaction tube containing 0.6 g. of nickel peroxide (active oxygen content=0.004 g-atom/g.), 5 ml. of n-heptane and 0.0024 mole of triethylaluminum (kept in a small breakable ampoule until the polymerization is started). The reaction tube is sealed. After breaking the ampoule keeping triethylaluminum therein, the polymerization is carried out by shaking the reaction tube in a thermostat maintained at 40° C. for 24 hours. Then, the content in the reaction tube is poured into a large amount of methanol containing hydrochloric acid to precipitate the polymer and to decompose the catalyst. The precipitated polymer is collected and purified by treating with a mixture of methanol and hydrochloric acid while agitation. The resultant polymer is further purified by reprecipitation from cyclohexanone with methanol. The precipitated polymer is collected and dried to give 1.09 g. of polyvinyl chloride.

IR absorbance ratio: $D_{638}/D_{690}=2.65$.

Degree of polymerization: $\bar{P}=1,000$.

EXAMPLE 2

The polymerization of 5 ml. of vinyl chloride is carried out using 2.2 g. of nickel peroxide (active oxygen content=0.004 g-atom/g.), 5 ml. of n-hexane and 0.0024 mole of triethylaluminum (kept in a small breakable ampoule until the polymerization is started) as in Example 1 to give 1.34 g. of polyvinyl chloride.

IR absorbance ratio: $D_{638}/D_{690}=2.23$, $D_{613}/D_{690}=2.23$.

Degree of polymerization: $\bar{P}=1,040$.

EXAMPLE 3

The polymerization of 5 ml. of vinyl chloride is carried out using 2.2 g. of nickel peroxide (active oxygen content=0.004 g-atom/g.), 2.5 ml. of n-heptane and 0.00125 mole of diethylzinc (kept in a small breakable ampoule until the polymerization is started) as in Example 1 to give 1.36 g. of polyvinyl chloride.

IR absorbance ratio: $D_{638}/D_{690}=2.30$, $D_{613}/D_{690}=2.41$.

Degree of polymerization: $\bar{P}=780$.

EXAMPLE 4

The polymerization of 5 ml. of vinyl chloride is carried out using 2 g. of nickel peroxide (active oxygen content=0.004 g-atom/g.), 5 ml. of n-hexane and 0.000525 mole of triethylaluminum (kept in a small breakable ampoule until the polymerization is started) as in Example 1 to give 2.65 g. of polyvinyl chloride.

IR absorbance ratio: $D_{638}/D_{690}=2.15$, $D_{613}/D_{690}=2.08$.

EXAMPLE 5

The polymerization of 2.5 ml. of vinyl chloride is carried out using 1 g. of nickel peroxide (active oxygen content=0.004 g-atom/g.), 2.5 ml. of n-heptane and 0.00125 mole of triethylaluminum (kept in a small breakable ampoule until the polymerization is started (as in Example 1 to give 2.25 g. of polyvinyl chloride.

IR absorbance ratio: $D_{638}/D_{690}=2.05$, $D_{613}/D_{690}=2.10$.

Degree of polymerization: $\bar{P}=1,300$.

EXAMPLE 6

The polymerization of 1 ml. of vinyl chloride is carried out using 0.4 g. of nickel peroxide (active oxygen content=0.004 g-atom/g.), 1 ml. of n-heptane and 0.001 mole of triethylaluminum (kept in a small breakable ampoule until the polymerization is started) as in Example 1 to give 0.65 g. of polyvinyl chloride.

IR absorbance ratio: $D_{638}/D_{690}=2.10$, $D_{613}/D_{690}=2.20$.

Degree of polymerization: $\bar{P}=1,100$.

When the amount of triethylaluminum in the above polymerization is 0.00167 mole, there is obtained 0.308 g. of polyviny chloride.

IR absorbance ratio: $D_{638}/D_{690}=2.30$, $D_{613}/D_{690}=2.35$.
Degree of polymerization: $\overline{P}=970$.

EXAMPLE 7

The polymerization of 5 ml. of vinyl chloride is carried out using 2.2 g. of nickel peroxide (active oxygen content=0.004 g-atom/g.), 5 ml. of n-heptane and 0.0024 mole of triethylaluminum (kept in a small breakable ampoule until the polymerization is started) as in Example 1 but at 0° C., to give 1.65 g. of polyvinyl chloride.

IR absorbance ratio: $D_{638}/D_{690}=2.17$, $D_{613}/D_{690}=2.20$.

Degree of polymerization: $\overline{P}=630$.

When the reaction temperature in the above polymerization is −75° C., there are obtained 2.12 g. of polyvinyl chloride.

IR absorbance ratio: $D_{638}/D_{690}=2.32$, $D_{613}/D_{690}=2.92$.
Degree of polymerization: $\overline{P}=520$.

The Bragg $d$ spacings estimated from the X-ray diffraction pattern are almost identical with those reported for a syndiotactic polyvinyl chloride structure [Natta et al.: J. Polymer Sci., 20, 251 (1956)].

The NMR spectral analysis shows the that syndiotactic sequence is present in 62.5%.

EXAMPLE 8

Five millilitres of vinyl chloride are introduced by distillation into an evacuated reaction tube containing a certain amount of nickel peroxide (active oxygen content=0.004 g-atom/g.), 5 ml. of n-heptane and 0.0021 mole of tri-n-butylboron (kept in a small breakable ampoule until the polymerization is started). The reaction tube is sealed. After breaking the ampoule keeping tri-n-butylboron therein, the polymerization is carried out by allowing the reaction tube to stand at −78° C. for 40 hours. The reaction tube is opened and methanolic ammonia added thereto. The content is then poured into a large amount of methanol containing hydrochloric acid. The precipitated polymer is collected and purified by treating with a mixture of methanol and hydrochloric acid while agitation. The resultant polymer is further purified reprecipitation from cyclohexanone with methanol. The precipitated polymer is collected and dried to give polyvinyl chloride. The results are shown in the following table:

TABLE

| Amount of nickel peroxide used (g.) | Conversion (percent) | Product | | |
|---|---|---|---|---|
| | | $D_{638}/D_{690}$ | $D_{613}/D_{690}$ | $\overline{P}$ |
| 0.52 | 57.3 | 2.52 | 2.67 | 380 |
| 1.04 | 77.9 | 2.61 | 2.75 | 360 |
| 1.56 | 92.1 | 2.68 | 2.64 | 350 |
| 2.20 | 100 | 2.59 | 2.71 | 340 |

EXAMPLE 9

Five millilitres of vinyl chloride are introduced by distillation into an evacuated reaction tube containing 2.2 g. of nickel peroxide (active oxygen content=0.004 g-atom/g.), 5 ml. of n-heptane and Ziegler-Natta catalyst consisting of 0.00052 mole of triethylaluminum and 0.00026 mole of titanium tetrachloride (kept in a small breakable ampoule until the polymerization is started). The reaction tube is sealed. After breaking the ampoule keeping Ziegler-Natta catalyst therein, the polymerization is carried out by shaking the reaction tube in a thermostat maintained at 60° C. for 24 hours. Then, the content in the reaction tube is poured into a large amount of methanol containing hydrochloric acid to precipitate the polymer and decompose the catalyst. The precipitated polymer is collected and purified by treating with a mixture of methanol and hydrochloric acid while agitation. The resultant polymer is further purified by reprecipitation from cyclohexanone with methanol. The precipitated polymer is collected and dried to give 2.42 g. of polyvinyl chloride of which the chlorine content is 56.63%. Conversion, 52.5%.

IR absorbance ratio: $D_{638}/D_{690}=2.33$, $D_{613}/D_{690}=2.46$.
Degree of polymerization: $\overline{P}=830$.

When nickel peroxide is not present in the above catalyst compositon, there is obtained a polymer of which the chlorine content is only 9.88%.

When the reaction temperature in the above polymerization is 40° C., there is obtained polyvinyl chloride in 24.3% conversion.

IR absorbance ratio: $D_{638}/D_{690}=2.36$, $D_{613}/D_{690}=2.13$.
Degree of polymerization: $\overline{P}=850$.

What is claimed is:

1. A process for preparing polyvinyl chloride with comprises polymerizing vinyl chloride at a temperature of from −80° C. to 100° C. in an inert atmosphere in the presence of a catalyst composition consisting essentially of nickel peroxide and an alkyl metal represented by the formula: $R_nM$ wherein R is a lower alkyl group, M is a metal of Groups II to IV of the Periodic Table and $n$ is an integer corresponding to the valence of the metal represented by M, where the ratio of the active oxygen content represented by gram atoms in the nickel peroxide and the mole number of the alkyl metal is substantially from 1:1 to 15:1.

2. The processing according to claim 1, wherein the alkyl metal is triethylaluminum.

3. The process according to claim 1, wherein the alkyl metal is diethylzinc.

4. The process according to claim 1, wherein the alkyl metal is tri-n-butylboron.

5. A process for preparing polyvinyl chloride which comprises polymerizing vinyl chloride at a temperature of from −80° C. to 100° C. in an inert atmosphere in the presence of a catalyst composition consisting essentially of nickel peroxide and a Ziegler-Natta catalyst which consists essentially of an alkyl metal represented by the formula $R_nM$ wherein R is a lower alkyl group, M is a metal of Groups II to IV of the Periodic Table and $n$ is an integer corresponding to the valence of the metal represented by M and a metal halide represented by the formula: $M'X_m$ wherein M' is a transition metal, X is a halogen atom and $m$ is an integer corresponding to the valence of the metal represented by M', where the ratio of the active oxygen content in the nickel peroxide represented in gram atoms and, the mole number of the alkyl metal and of the metal halide is substantially 35:2:1.

6. The process according to claim 5, wherein the alkyl metal is triethylaluminum and the metal halide is titanium tetrachloride.

References Cited

FOREIGN PATENTS 1,379,226  10/1964  France.
834,937  5/1960  Great Britain.

JOSEPH L. SCHOFER, Primary Examiner
JOHN A. DONAHUE, Jr., Assistant Examiner

U.S. Cl. X.R.
252—429